(12) United States Patent
Chao (10) Patent No.: US 10,900,802 B2
(45) Date of Patent: Jan. 26, 2021

(54) MAP BASED NAVIGATION METHOD, APPARATUS, STORAGE MEDIUM AND EQUIPMENT (71) Applicant: BAIDU ONLINE NETWORK TECHNOLOGY (BEIJING) CO., LTD., Beijing (CN)

(72) Inventor: Xin Chao, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 44 days.

(21) Appl. No.: 16/147,268

(22) Filed: Sep. 28, 2018

(65) Prior Publication Data
US 2019/0033093 A1 Jan. 31, 2019

Related U.S. Application Data (63) Continuation of application No. PCT/CN2016/096101, filed on Aug. 19, 2016.

(51) Int. Cl.
G01C 21/36 (2006.01)
G01C 21/34 (2006.01)

(52) U.S. Cl.
CPC ..... G01C 21/3676 (2013.01); G01C 21/3407 (2013.01)

(58) Field of Classification Search
None
See application file for complete search history.

(56) References Cited

U.S. PATENT DOCUMENTS

2008/0114538 A1 5/2008 Lindroos

FOREIGN PATENT DOCUMENTS

| CN | 1629605 A | 6/2005 |
| CN | 1629605 A | 6/2005 |
| CN | 102297698 A | 12/2011 |
| CN | 102297698 A | 12/2011 |
| CN | 102667403 A | 9/2012 |
| CN | 104729515 A | 6/2015 |
| DE | 102010043310 A1 | 5/2012 |

(Continued)

OTHER PUBLICATIONS

International Search Report for PCT/CN2016/096101, dated Dec. 26, 2016.

Primary Examiner — Abdhesh K Jha
(74) Attorney, Agent, or Firm — von Briesen & Roper, s.c.

(57) ABSTRACT

A map based navigation method, apparatus, storage medium and equipment are provided. The method executed by the navigation terminal includes: receiving a current navigation route, an alternative navigation route and virtual driving information of a current user sent by a navigation server; determining and displaying a real location of the current user driving on the current navigation route; and determining and displaying, according to the virtual driving information of the current user, a virtual location of the current user driving in simulation on the alternative navigation route. For the technical solution provided by the present embodiment, in the route navigation process, the navigation terminal not only displays the real location of the user driving on the current navigation route, but also simulates and displays the virtual location of the user driving on the alternative navigation route according to the virtual driving information of the user.

10 Claims, 5 Drawing Sheets (56) References Cited

FOREIGN PATENT DOCUMENTS

| JP | 2009014423 A | 1/2009 |
|----|--------------|--------|
| JP | 2009014423 A | 1/2009 |
| JP | 2012255695 A | 9/2010 |
| JP | 2011257292 A | 12/2011 |
| JP | 2010204008 A | 12/2012 |
| JP | 2013007683 A | 1/2013 |

MAP BASED NAVIGATION METHOD, APPARATUS, STORAGE MEDIUM AND EQUIPMENT

CROSS-REFERENCE TO RELATED APPLICATIONS

This application is a continuation of International Application PCT/CN2016/096101, with an international filing date of Aug. 19, 2016, which claims priority to Chinese Patent Application no. 201610197194.8, filed with the China National Intellectual Property Administration (CNIPA) on Mar. 31, 2016, the contents of which are incorporated herein by reference in their entirety.

TECHNICAL FIELD

The present disclosure relates to the field of navigation technology, specifically relates to a map based navigation method, apparatus, storage medium and equipment.

BACKGROUND

With the ever-increasing popularity of the GPS (Global Positioning System), more and more consumers obtain instant route planning information through portable smart terminals while driving or walking. The basic procedure of the existing route navigation is: the user starts the navigation client software installed in a smart terminal, inputs the start position and end position, and sends the positions to a corresponding navigation server, the navigation server generates a navigation route based on the start and end position information and sends it back to the client software, the client software guides the user's driving or walking according to the navigation route.

With the continuous development of technologies, requirements for navigation products are also increasing. The traditional navigation products can no longer satisfy one's ever-growing needs for and convenient and individualized navigation.

SUMMARY

In view of the above, embodiments of the present disclosure provide a map based navigation method, apparatus, storage medium and equipment, to improve the customer satisfaction with the navigation mode.

In a first aspect, the embodiments of the present disclosure provide a map based navigation method, the method includes:

receiving a current navigation route, an alternative navigation route and virtual driving information of a current user sent by a navigation server;

determining and displaying a real location of the current user driving on the current navigation route; and determining and displaying, according to the virtual driving information of the current user, a virtual location of the current user driving in simulation on the alternative navigation route.

In a second aspect, the embodiments of the present disclosure provide a map based navigation method, the method includes:

sending a current navigation route and an alternative navigation route to a navigation terminal held by a current user, causing the navigation terminal to determine and display, according to the current navigation route, a real location of the current user driving on the current navigation route; and sending virtual driving information of the current user to the navigation terminal, causing the navigation terminal to determine and display, according to the virtual driving information, a virtual location of the current user driving in simulation on the alternative navigation route.

In a third aspect, the embodiments of the present disclosure provide a map based navigation apparatus, the apparatus includes:

an information receiving module, configured for receiving a current navigation route, an alternative navigation route and virtual driving information of a current user sent by a navigation server;

a real location module, configured for determining and display a real location of the current user driving on the current navigation route; and a virtual location module, configured for determining and display, according to the virtual driving information of the current user, a virtual location of the current user driving in simulation on the alternative navigation route.

In a fourth aspect, the embodiments of the present disclosure provide a map based navigation apparatus, the apparatus includes:

a route sending module, configured for sending a current navigation route and an alternative navigation route to a navigation terminal held by a current user, causing the navigation terminal to determine and display, according to the current navigation route, a real location of the current user driving on the current navigation route; and a virtual information sending module, configured for sending virtual driving information of the current user to the navigation terminal, causing the navigation terminal to determine and display, according to the virtual driving information, a virtual location of the current user driving in simulation on the alternative navigation route.

In a fifth aspect, the embodiments of the present disclosure further provide a non-volatile computer storage medium, storing one or more modules, wherein the one or more modules, when executed by a device executing a map based navigation method, cause the device to perform the following operations:

receiving a current navigation route, an alternative navigation route and virtual driving information of a current user sent by a navigation server;

determining and displaying a real location of the current user driving on the current navigation route; and determining and displaying, according to the virtual driving information of the current user, a virtual location of the current user driving in simulation on the alternative navigation route.

In a sixth aspect, the embodiments of the present disclosure further provide a non-volatile computer storage medium, storing one or more modules, wherein the one or more modules, when executed by a device executing a map based navigation method, cause the device to perform the following operations:

sending a current navigation route and an alternative navigation route to a navigation terminal held by a current user, causing the navigation terminal to determine and display, according to the current navigation route, a real location of the current user driving on the current navigation route; and sending virtual driving information of the current user to the navigation terminal, causing the navigation terminal to determine and display, according to the virtual driving information, a virtual location of the current user driving in simulation on the alternative navigation route.

In a seventh aspect, the embodiments of the present disclosure provide a device, including:

one or more processors;

a memory; and one or more programs, the one or more programs being stored in the memory, when executed by the one or more processors, perform the following operations:

receiving a current navigation route, an alternative navigation route and virtual driving information of a current user sent by a navigation server;

determining and displaying a real location of the current user driving on the current navigation route; and determining and displaying, according to the virtual driving information of the current user, a virtual location of the current user driving in simulation on the alternative navigation route.

In an eighth aspect, the embodiments of the present disclosure provide a device, including:

one or more processors;

a memory; and one or more programs, the one or more programs being stored in the memory, when executed by the one or more processors, perform the following operations:

sending a current navigation route and an alternative navigation route to a navigation terminal held by a current user, causing the navigation terminal to determine and display, according to the current navigation route, a real location of the current user driving on the current navigation route; and sending virtual driving information of the current user to the navigation terminal, causing the navigation terminal to determine and display, according to the virtual driving information, a virtual location of the current user driving in simulation on the alternative navigation route.

According to the technical solution provided by the embodiments of the present disclosure, in the route navigation process, the navigation terminal not only displays the real location of the user driving on the current navigation route, but also simulates and displays the virtual location of the user driving on the alternative navigation route according to the virtual driving information of the user. The technical solution facilitates the user to compare the current navigation route with the alternative navigation route through the real location and the virtual location, can satisfy the user's need to know the driving status of both the current navigation route and the alternative navigation route at the same time, and improves the user's satisfaction with the navigation mode. Other aspects will become more apparent upon reading and understanding the accompanying drawings and the detailed description.

BRIEF DESCRIPTION OF THE DRAWINGS

To describe the technical solution in the embodiments of the present disclosure more clearly, the following briefly introduces the accompanying drawings required for describing the embodiments. Apparently, the accompanying drawings in the following description are merely some embodiments of the present disclosure, for those of ordinary skill in the art, these accompanying drawings may also be modified and replaced without creative work.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure rather than the whole structure are shown in the accompanying drawings.

The First Embodiment

Figure 1:
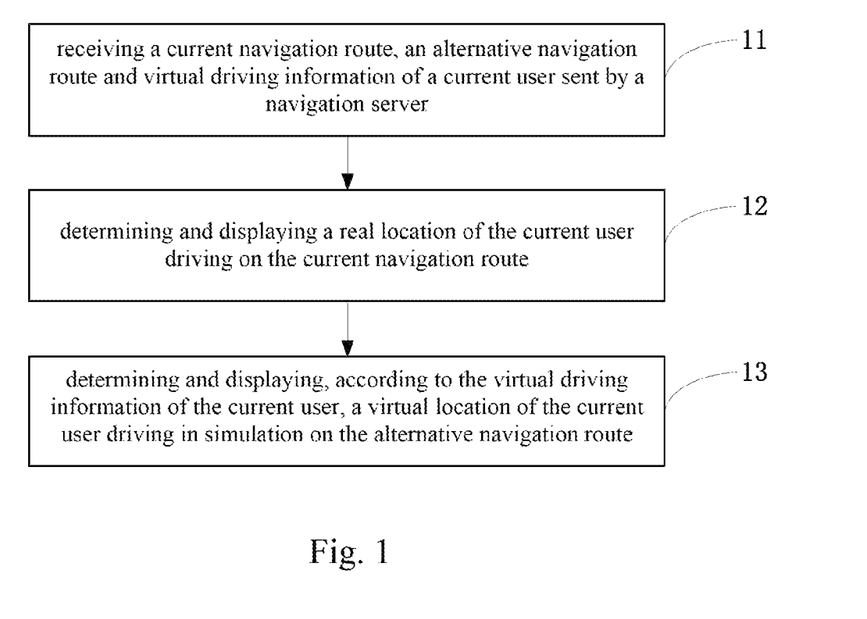
FIG. 1 is a flowchart of a map based navigation method according to the first embodiment of the present disclosure.

FIG. 1 is a flowchart of a map based navigation method according to the first embodiment of the present disclosure. The method of the present embodiment may be performed by a map based navigation apparatus. The apparatus may be executed by means of hardware and/or software and may generally be integrated in a navigation client. The method of the present embodiment may be generally applicable to users who want to know the driving status of both the current navigation route and the alternative navigation route at the same time. Referring to FIG. 1, the map based navigation method provided by the present embodiment specifically includes the following:

S11, receiving a current navigation route, an alternative navigation route and virtual driving information of a current user sent by a navigation server.

In the present embodiment, the navigation server refers to a server having a route navigation function, such as a map application server. The current navigation route refers to the navigation route where the current user is located. The start and end point of the navigation (i.e., the navigation start point and the navigation end point) of the alternative navigation route is the same to the start and end point of the navigation of the current navigation route, and the number of the alternative navigation routes may be a fixed value, such as there are three alternative navigation routes. The virtual driving information of the current user is used to simulate the virtual driving behavior of the current user on the alternative navigation route, such as the virtual driving speed or the virtual driving track.

Specifically, in the process of the route navigation, the navigation terminal held by the current user sends a route navigation request containing the start and end point of the navigation to the navigation server, and the navigation server determines the current navigation route, the alternative navigation route and the virtual driving information of the current user according to the start and end point of the navigation, and sends the determined current navigation route, alternative navigation route and virtual driving information to the navigation terminal, wherein the navigation terminal carries the navigation client.

S12, determining and displaying a real location of the current user driving on the current navigation route.

Specifically, the navigation terminal may acquire the location of the current user, such as the latitude and longitude information of the location, through a Global Positioning System (GPS) module preset in the navigation terminal. The navigation terminal may further project the location of the current user on the current navigation route, and determine the projected location as the real location of the current user driving on the current navigation route and display the determined real location.

S13, determining and displaying, according to the virtual driving information of the current user, a virtual location of the current user driving in simulation on the alternative navigation route.

Specifically, in the process of the current user driving on the current navigation route, the navigation terminal simulates the real-time virtual driving situation of the current user on the alternative navigation route according to the virtual driving information so as to determine and display the virtual location of the current user driving in simulation on the alternative navigation route. For example, it is simulated that the current user drives uniformly on the alternative navigation route at a set speed, or an actual driving trajectory of another user on the alternative navigation route is used as the virtual driving trajectory of the current user on the alternative navigation route. It needs to be noted that the initial virtual location is the same as the initial real location, for example, the start point of the navigation.

According to the technical solution provided by the present embodiment, in the route navigation process, the navigation terminal not only displays the real location of the user driving on the current navigation route, but also simulates and displays the virtual location of the user driving on the alternative navigation route according to the virtual driving information of the user. The technical solution facilitates the user to compare the current navigation route with the alternative navigation route through the real location and the virtual location, can satisfy the user's need to know the driving status of both the current navigation route and the alternative navigation route at the same time, and improves the user satisfaction with the navigation mode.

Illustratively, the determining and displaying, according to the virtual driving information of the current user, a virtual location of the current user driving in simulation on the alternative navigation route may include: determining and displaying, according to an average speed of the alternative navigation route included in the virtual driving information, the virtual location of the current user driving in simulation on the alternative navigation route, wherein the average speed is determined by the navigation server according to road condition information of the alternative navigation route.

Specifically, after acquiring the average speed of the alternative navigation route, the navigation terminal simulates the current user to drive in simulation on the alternative navigation route at the average speed, to obtain and display the virtual location of the current user on the alternative navigation route.

It needs to be noted that the average speed of the alternative navigation route may also be determined by the navigation terminal. For example, the navigation server pushes road condition data of the alternative navigation route and the road grade of the alternative navigation route where the virtual location is located to the navigation terminal. The navigation terminal estimates, based on the received road condition data and road grade, the average speed on the alternative navigation route. Here, the navigation server may push minute-level road condition data.

Illustratively, the determining and displaying, according to the virtual driving information of the current user, a virtual location of the current user driving in simulation on the alternative navigation route may also include: determining, according to real driving information of a reference user associated with the current user included in the virtual driving information, the virtual location of the current user driving in simulation on the alternative navigation route, wherein the reference user is determined by the navigation server according to current time, a current virtual location, and the alternative navigation route.

Specifically, the navigation server determines the reference user associated with the current user according to the current time, the current virtual location and the alternative navigation route. For example, the navigation server may set the user passing the current virtual location within a time period before and after the current time and actually driving on the alternative navigation route as the reference user of the current user, and send the real driving information of the reference user to the navigation terminal. The navigation terminal uses the real driving information of the reference user to simulate the current user to drive in simulation on the corresponding alternative navigation route, and determines and displays the virtual location.

It needs to be noted that the reference user associated with the current user may be different in different road sections of the alternative navigation route. For example, when the alternative navigation route includes road 1, road 2 and road 3 that are sequentially connected, the reference user associated with the current user at road 1 and road 2 may be reference user 1, and the reference user associated with the current user at road 3 may be reference user 2.

It also needs to be noted that the virtual driving information may include both the average speed of the alternative navigation route and the real driving information of the reference user. For example, for alternate navigation route 1 and alternative navigation route 2, the navigation server may push both the average speed of alternative navigation route 1 and real users associated with alternative navigation route 2 to the navigation terminal, such that the navigation terminal respectively determines the virtual locations of the current user on alternate navigation route 1 and on alternative navigation route 2.

The Second Embodiment

Figure 2:
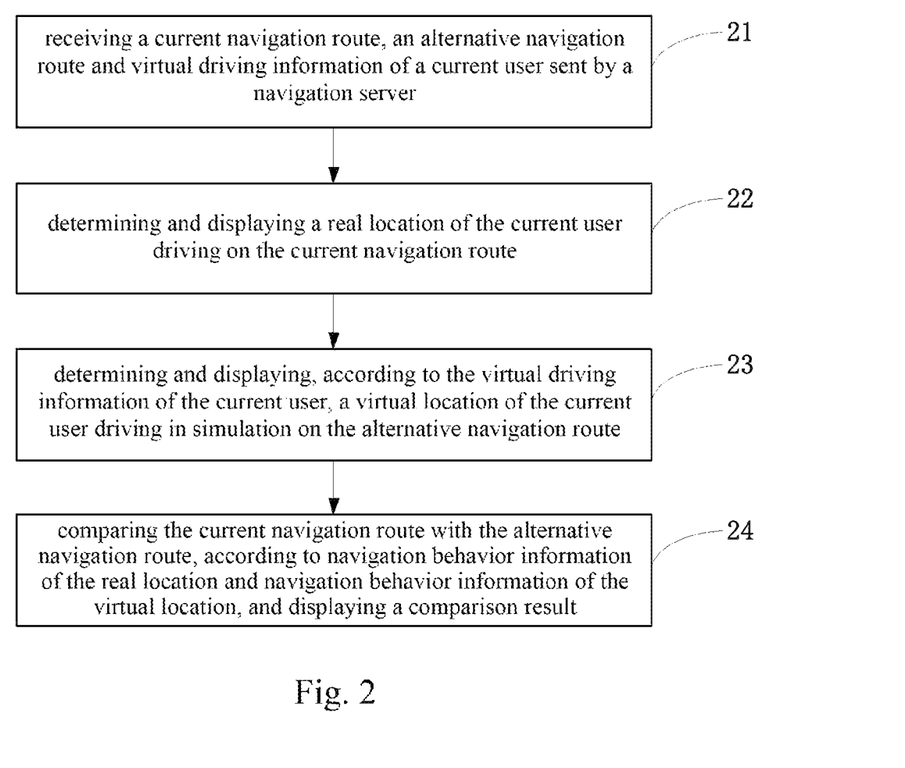
FIG. 2 is a flowchart of a map based navigation method according to the second embodiment of the present disclosure.

The present embodiment provides a new map based navigation method on the basis of the above first embodiment. FIG. 2 is a flowchart of a map based navigation method according to the second embodiment of the present disclosure. Referring to FIG. 2, the map based navigation method provided by the present embodiment specifically includes the following:

S21, receiving a current navigation route, an alternative navigation route and virtual driving information of a current user sent by a navigation server;

S22, determining and displaying a real location of the current user driving on the current navigation route.

S23, determining and displaying, according to the virtual driving information of the current user, a virtual location of the current user driving in simulation on the alternative navigation route.

The navigation terminal held by the current user not only displays the real location of the current user driving on the current navigation route, but also simulates the current user driving on the alternative navigation route, and displays the virtual location of the current user driving in simulation on the alternative navigation route, which enables the current user to know the advantages and the disadvantages of the current navigation route and the alternative navigation route by comparing the real location with the virtual location in the route navigation process, that it, satisfies the current user's need to know the driving statuses of multiple routes at the same time.

S24, according to navigation behavior information of the real location and navigation behavior information of the virtual location, comparing the current navigation route with the alternative navigation route, and displaying a result of the comparison.

Further, in order to facilitate the current user to acquire the driving statuses of the multiple routes more intuitively, the navigation terminal further compares the current navigation route with the alternative navigation route according to the navigation behavior information of the real location and the navigation behavior information of the virtual location, and displays the result of the comparison.

Here, the navigation behavior information may include at least one of navigation time, information on driving comfort, or road attribute information. The information on driving comfort may be the road grade, a drastic driving behavior such as a rapid acceleration, a rapid deceleration or a sharp turn. The road attribute information may be the number of traffic lights or road fees. Specifically, the navigation terminal may compare the navigation time of the real location to the navigation end point with the navigation time of the virtual location to the navigation end point, to determine which navigation route is faster, so that the current user knows the competition between the real location and the virtual location from the start point to the end point of the navigation. The navigation terminal may also compare the driving comfort and the road attributes of different navigation routes, enabling the current user to know more abundant driving statuses of the multiple routes, improving the satisfaction of the user experience.

According to the technical solution provided by the present embodiment, in the route navigation process, the navigation terminal not only displays the real location of the user driving on the current navigation route, but also simulates and displays the virtual location of the user driving on the alternative navigation route according to the virtual driving information of the user, and compares the current navigation route with the alternative navigation route, according to the navigation behavior information of the real location and the navigation behavior information of the virtual location. The technical solution facilitates the current user to know more abundant driving statuses of the multiple routes, and improves the satisfaction of the user experience.

The Third Embodiment

Figure 3A:
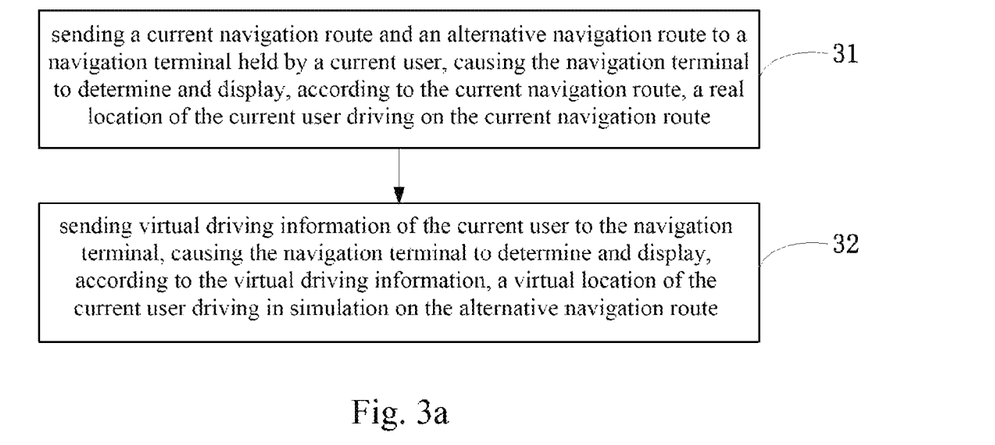
FIG. 3a is a flowchart of a map based navigation method according to the third embodiment of the present disclosure.

FIG. 3a is a flowchart of a map based navigation method according to the third embodiment of the present disclosure.

The method of the present embodiment may be performed by a map based navigation apparatus. The apparatus may be executed by means of hardware and/or software and may generally be integrated in a navigation server. The method of the present embodiment may be generally applicable to users who want to know the driving status of both the current navigation route and the alternative navigation route at the same time. Referring to FIG. 3a, the map based navigation method provided by the present embodiment specifically includes the following:

S31, sending a current navigation route and an alternative navigation route to a navigation terminal held by a current user, causing the navigation terminal to determine and display, according to the current navigation route, a real location of the current user driving on the current navigation route.

Here, the navigation terminal carries the navigation client. The current navigation route refers to the navigation route where the current user is located. The start and endpoint of the navigation (i.e., the navigation start point and the navigation end point) of the alternative navigation route is the same to the start and end point of the navigation of the current navigation route, and the number of the alternative navigation routes may be a fixed value, such as there are three alternative navigation routes.

Specifically, in the route navigation process, the navigation terminal held by the current user sends a route navigation request containing the start and end point of the navigation to the navigation server, and the navigation server determines the current navigation route, the alternative navigation route and the virtual driving information of the current user according to the start and end point of the navigation, and sends the determined current navigation route, alternative navigation route and virtual driving information to the navigation terminal.

S32, sending virtual driving information of the current user to the navigation terminal, causing the navigation terminal to determine and display, according to the virtual driving information, a virtual location of the current user driving in simulation on the alternative navigation route.

Figure 3B:
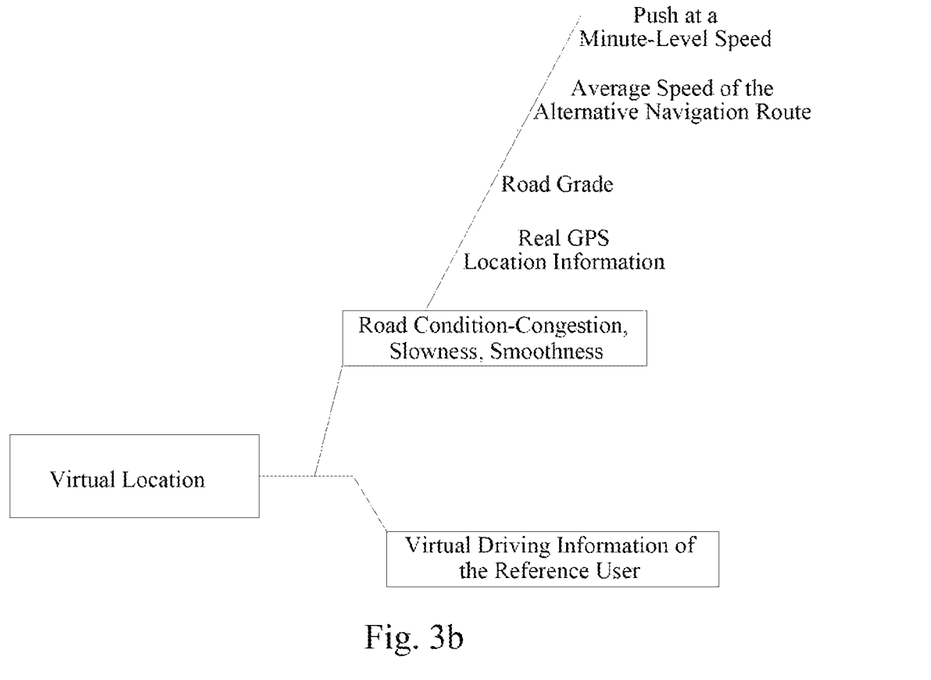
FIG. 3b is a schematic diagram of virtual driving information according to the third embodiment of the present disclosure.

Specifically, the navigation server determines the virtual driving information of the current user according to the start and end point of the navigation, and sends the determined virtual driving information to the navigation terminal. Referring to FIG. 3b, the virtual driving information of the current user may be the average speed of the alternative navigation route, and/or, real driving information of a reference user associated with the current user on the alternative navigation route.

Illustratively, the average speed may be determined by following approach: determining the average speed of the alternative navigation route according to current time and road condition information of the alternative navigation route. Specifically, referring to FIG. 3b, the navigation server acquires the road condition information (such as congestion, slowness or smoothness) of the alternative navigation route, receives the real GPS location information of the current user returned by the navigation terminal, determines the average speed of the alternative navigation route by combining the road condition information of the alternative navigation route, the real GPS location information of the current user and the road grade of the alternative navigation route (such as the main road, the secondary road and the branch road), and pushes the average speed at a minute level. The navigation terminal can determine the virtual location according to the acquired average speed.

It needs to be noted that the average speed of the alternative navigation route may also be determined by the navigation terminal. For example, the navigation server pushes the road condition data of the alternative navigation route and the road grade of the alternative navigation route where the virtual location is located to the navigation terminal. The navigation terminal estimates, according to the received road condition data and road grade, the average speed on the alternative navigation route. Here, the navigation server may push minute-level road condition data.

Illustratively, the reference user may be determined by following approach: determining the reference user associated with the current user, according to the current time, a current virtual location and the alternative navigation route, upon detecting a reference user event, wherein an initial virtual location is a navigation start point of the current user. Specifically, referring to FIG. 3b, the navigation server determines the reference user associated with the current user, according to the current time, the current virtual location and the alternative navigation route, and sends the virtual driving information of the reference user to the navigation terminal. The navigation terminal can determine the virtual location according to the acquired virtual driving information of the reference user.

Illustratively, if the current virtual location is the route decision point of the alternative navigation route, the reference user event is generated. Here, the route decision point refers to a location where a route switching is possible, such as a road intersection point or a road accident obstacle point. Specifically, if the navigation server determines that the current user passes the route decision point during the virtual driving process, the navigation server may reselect the reference user. In addition, in a navigation process, the navigation server may select simultaneously multiple reference users in different road sections to simulate the virtual location of the current user.

It needs to be noted that the virtual driving information may include both the average speed of the alternative navigation route and the real driving information of the reference user. For example, for alternate navigation route 1 and alternative navigation route 2, the navigation server may push both the average speed of alternative navigation route 1 and real users associated with alternative navigation route 2 to the navigation terminal, such that the navigation terminal respectively determines the virtual locations of the current user on alternate navigation route 1 and on alternative navigation route 2.

According to the technical solution provided by the present embodiment, in the route navigation process, the navigation server not only pushes the current navigation route and the alternative navigation route to the navigation terminal, but also determines and pushes the virtual driving information of the user, enabling the navigation terminal to simulate and display the virtual location of the user on the alternative navigation route. The technical solution facilitates the user to compare the current navigation route with the alternative navigation route through the real location and the virtual location, can satisfy the user's need to know the driving status of both the current navigation route and the alternative navigation route at the same time, and improves the user satisfaction with the navigation mode.

The Fourth Embodiment

Figure 4:
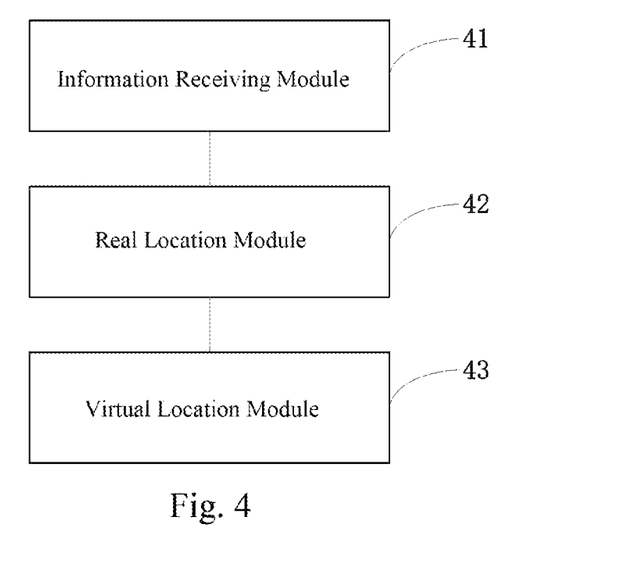
FIG. 4 is a structural diagram of a map based navigation apparatus according to the fourth embodiment of the present disclosure.

FIG. 4 is a structural diagram of a map based navigation apparatus according to the fourth embodiment of the present disclosure. The apparatus may be generally integrated in a navigation client, and the apparatus of the present embodiment may be generally applicable to users who want to know the driving status of both the current navigation route and the alternative navigation route at the same time. Referring to FIG. 4, the map based navigation apparatus provided by the present embodiment specifically includes the following:

an information receiving module 41, configured for receiving a current navigation route, an alternative navigation route and virtual driving information of a current user sent by a navigation server;

a real location module 42, configured for determining and display a real location of the current user driving on the current navigation route; and a virtual location module 43, configured for determining and display, according to the virtual driving information of the current user, a virtual location of the current user driving in simulation on the alternative navigation route.

Illustratively, the virtual location module 43 may be specifically configured for:

determining and displaying, according to an average speed of the alternative navigation route included in the virtual driving information, the virtual location of the current user driving in simulation on the alternative navigation route, wherein the average speed is determined by the navigation server according to road condition information of the alternative navigation route.

Illustratively, the virtual location module 43 may also be specifically configured for:

determining, according to real driving information of a reference user associated with the current user included in the virtual driving information, the virtual location of the current user driving in simulation on the alternative navigation route, wherein the reference user is determined by the navigation server according to current time, a current virtual location, and the alternative navigation.

Illustratively, the apparatus may further include:

a route comparison module, configured for, after determining and displaying, according to the virtual driving information of the current user, a virtual location of the current user driving in simulation on the alternative navigation route, according to navigation behavior information of the real location and navigation behavior information of the virtual location, comparing the current navigation route with the alternative navigation route, and displaying a result of the comparison.

Illustratively, the navigation behavior information may include at least one of navigation time, information on driving comfort, or road attribute information.

The map based navigation apparatus provided by the present embodiment and the map based navigation method executed by the navigation client provided by any embodiment of the present disclosure belong to the same inventive concept and may perform the map based navigation method executed by the navigation client provided by any embodiment of the present disclosure, and have the corresponding functional modules and beneficial effects of performing the corresponding method. For technical details not described in detail in the present embodiment, reference may be made to the corresponding method provided by any embodiment of the present disclosure.

The Fifth Embodiment

Figure 5:
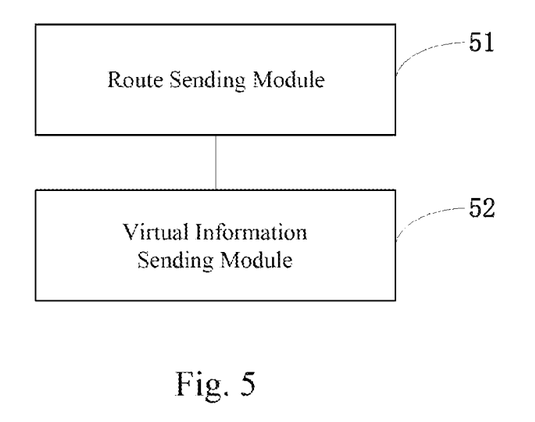
FIG. 5 is a structural diagram of a map based navigation apparatus according to the fifth embodiment of the present disclosure.

FIG. 5 is a structural diagram of a map based navigation apparatus according to the fifth embodiment of the present disclosure. The apparatus may be generally integrated in a navigation server, and the apparatus of the present embodiment may be generally applicable to users who want to know the driving status of both the current navigation route and the alternative navigation route at the same time. Referring to FIG. 5, the map based navigation apparatus provided by the present embodiment specifically includes the following:

a route sending module 51, configured for sending a current navigation route and an alternative navigation route to a navigation terminal held by a current user, causing the navigation terminal to determine and display, according to the current navigation route, a real location of the current user driving on the current navigation route; and a virtual information sending module 52, configured for sending virtual driving information of the current user to the navigation terminal, causing the navigation terminal to determine and display, according to the virtual driving information, a virtual location of the current user driving in simulation on the alternative navigation route.

Illustratively, the virtual driving information of the current user may be an average speed of the alternative navigation route, and/or, real driving information of a reference user associated with the current user on the alternative navigation route.

Illustratively, the apparatus may further include:

an average speed determining module, configured for determining the average speed of the alternative navigation route according to current time and road condition information of the alternative navigation route.

Illustratively, the apparatus may further include:

a reference user determining module, configured for determining the reference user associated with the current user, according to the current time, a current virtual location and the alternative navigation route, upon detecting a reference user event, wherein an initial virtual location is a navigation start point of the current user.

Illustratively, if the current virtual location is a route decision point of the alternative navigation route, the reference user event is generated.

The map based navigation apparatus provided by the present embodiment and the map based navigation method executed by the navigation server provided by any embodiment of the present disclosure belong to the same inventive concept and may perform the map based navigation method executed by the navigation server provided by any embodiment of the present disclosure, and have the corresponding functional modules and beneficial effects of performing the corresponding method. For technical details not described in detail in the present embodiment, reference may be made to the corresponding method provided by any embodiment of the present disclosure.

The Sixth Embodiment

The present embodiment further provides a non-volatile computer storage medium. The non-volatile computer storage medium stores one or more modules, wherein the one or more modules, when executed by a device executing a map based navigation method, cause the device to perform the following operations:

receiving a current navigation route, an alternative navigation route and virtual driving information of a current user sent by a navigation server;

determining and displaying a real location of the current user driving on the current navigation route; and determining and displaying, according to the virtual driving information of the current user, a virtual location of the current user driving in simulation on the alternative navigation route.

When the storage medium executes the method, the determining and displaying, according to the virtual driving information of the current user, a virtual location of the current user driving in simulation on the alternative navigation route, may include:

determining and displaying, according to an average speed of the alternative navigation route included in the virtual driving information, the virtual location of the current user driving in simulation on the alternative navigation route, wherein the average speed is determined by the navigation server according to road condition information of the alternative navigation route.

When the storage medium executes the method, the determining and displaying, according to the virtual driving information of the current user, a virtual location of the current user driving in simulation on the alternative navigation route, may include:

determining, according to real driving information of a reference user associated with the current user included in the virtual driving information, the virtual location of the current user driving in simulation on the alternative navigation route, wherein the reference user is determined by the navigation server according to current time, a current virtual location, and the alternative navigation route.

When the storage medium executes the method, after determining and displaying, according to the virtual driving information of the current user, a virtual location of the current user driving in simulation on the alternative navigation route, it may further include:

according to navigation behavior information of the real location and navigation behavior information of the virtual location, comparing the current navigation route with the alternative navigation route, and displaying a result of the comparison.

When the storage medium executes the method, the navigation behavior information includes at least one of navigation time, information on driving comfort, or road attribute information.

The Seventh Embodiment

The present embodiment further provides a non-volatile computer storage medium. The non-volatile computer storage medium stores one or more modules, wherein the one or more modules, when executed by a device executing a map based navigation method, cause the device to perform the following operations:

sending a current navigation route and an alternative navigation route to a navigation terminal held by a current user, causing the navigation terminal to determine and display, according to the current navigation route, a real location of the current user driving on the current navigation route; and sending virtual driving information of the current user to the navigation terminal, causing the navigation terminal to determine and display, according to the virtual driving information, a virtual location of the current user driving in simulation on the alternative navigation route.

When the storage medium executes the method, the virtual driving information of the current user is an average speed of the alternative navigation route, and/or, real driving information of a reference user associated with the current user on the alternative navigation route.

When the storage medium executes the method, the average speed is determined by following approach:

determining the average speed of the alternative navigation route according to current time and road condition information of the alternative navigation route.

When the storage medium executes the method, the reference user is determined by following approach:

determining the reference user associated with the current user, according to the current time, a current virtual location and the alternative navigation route, upon detecting a reference user event, wherein an initial virtual location is a navigation start point of the current user.

When the storage medium executes the method, if the current virtual location is a route decision point of the alternative navigation route, the reference user event is generated.

The Eighth Embodiment

Figure 6:
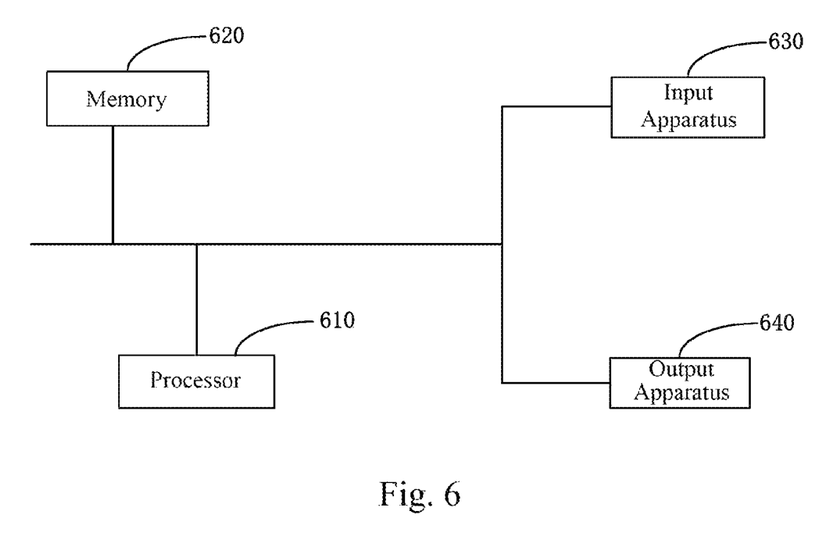
FIG. 6 is a schematic diagram of a hardware structure of a device for executing a map based navigation method according to the eighth embodiment of the present disclosure.

FIG. 6 is a schematic diagram of a hardware structure of a device for executing a map based navigation method according to the eighth embodiment of the present disclosure. Referring to FIG. 6, the device may include:

one or more processors 610, and one processor 610 is taken as an example in FIG. 6;

a memory 620; and one or more modules.

The device may further include: an input apparatus 630 and an output apparatus 640. The processors 610, the memory 620, the input apparatus 630 and the output apparatus 640 may be connected via a bus or other manners. FIG. 6 takes the connection via a bus as an example.

As a computer readable storage medium, the memory 620 may be used for storing software programs, computer executable programs and modules, for example, program instructions/modules corresponding to the map based navigation method in the embodiments of the present disclosure (for example, the information receiving module 41, the real location module 42 and the virtual location module 43 shown in FIG. 4). The processor 610 runs the software programs, instructions, and modules stored in the memory 620 to execute various functional applications and data processing of the device, so as to implement the map based navigation method as discussed in the above method embodiment.

The memory 620 may include a program storage area and a data storage area. The program storage area may store an operating system and an application program for at least one function. The data storage area may store data created according to the use of the terminal device, and the like. In addition, the memory 620 may include a high speed random access memory, and may further include a non-volatile memory, for example, at least one magnetic disk storage device, a flash memory device, or other non-volatile solid state storage devices. In some embodiments, the memory 620 may further include memories disposed remote to the processors 610. These remote memories may be connected to the terminal device through a network. Examples of the network include, but are not limited to, the Internet, an enterprise intranet, a local area network, a mobile communication network, and a combination thereof.

The input apparatus 630 may be used for receiving input digital or character information, and generating key signal inputs related to user settings of the terminal and the function control. The output apparatus 640 may include a display screen or other display devices.

The one or more modules are stored in the memory 620, and, when executed by the one or more processors 610, perform the following operations:

receiving a current navigation route, an alternative navigation route and virtual driving information of a current user sent by a navigation server;

determining and displaying a real location of the current user driving on the current navigation route; and determining and displaying, according to the virtual driving information of the current user, a virtual location of the current user driving in simulation on the alternative navigation route.

Alternatively, the determining and displaying, according to the virtual driving information of the current user, a virtual location of the current user driving in simulation on the alternative navigation route, includes:

determining and displaying, according to an average speed of the alternative navigation route included in the virtual driving information, the virtual location of the current user driving in simulation on the alternative navigation route, wherein the average speed is determined by the navigation server according to road condition information of the alternative navigation route.

Alternatively, the determining and displaying, according to the virtual driving information of the current user, a virtual location of the current user driving in simulation on the alternative navigation route, includes:

determining, according to real driving information of a reference user associated with the current user included in the virtual driving information, the virtual location of the current user driving in simulation on the alternative navigation route, wherein the reference user is determined by the navigation server according to current time, a current virtual location, and the alternative navigation route.

Alternatively, after determining and displaying, according to the virtual driving information of the current user, a virtual location of the current user driving in simulation on the alternative navigation route, the operations further include:

according to navigation behavior information of the real location and navigation behavior information of the virtual location, comparing the current navigation route with the alternative navigation route, and displaying a result of the comparison.

Alternatively, the navigation behavior information includes at least one of navigation time, information on driving comfort, or road attribute information.

The Ninth Embodiment

Figure 7:
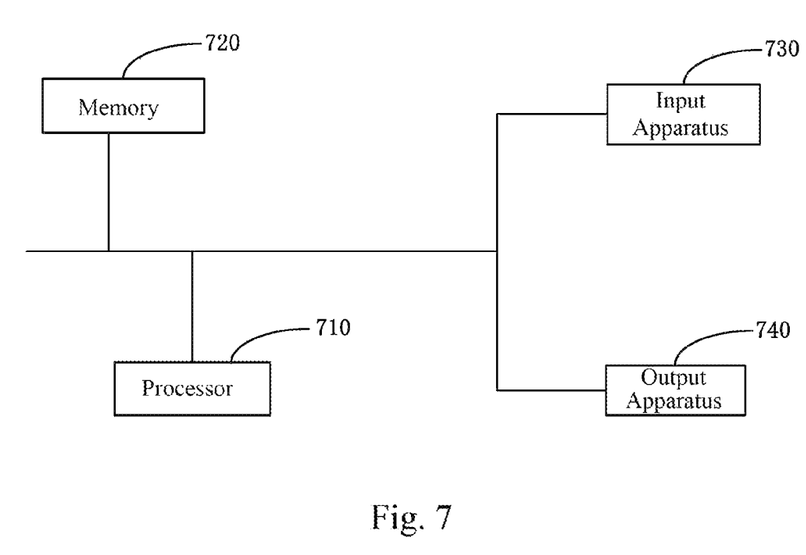
FIG. 7 is a schematic diagram of a hardware structure of a device for executing a map based navigation method according to the ninth the ninth embodiment of the present disclosure.

FIG. 7 is a schematic diagram of a hardware structure of a device for executing a map based navigation method according to the ninth embodiment of the present disclosure. Referring to FIG. 7, the device may include:

one or more processors 710, and one processor 710 is taken as an example in FIG. 7;

a memory 720; and one or more modules.

The device may further include: an input apparatus 730 and an output apparatus 740. The processors 710, the memory 720, the input apparatus 730 and the output apparatus 740 may be connected via a bus or other manners. FIG. 7 takes the connection via a bus as an example.

As a computer readable storage medium, the memory 720 may be used for storing software programs, computer executable programs and modules, for example, program instructions/modules corresponding to the map based navigation method in the embodiments of the present disclosure (for example, the route sending module 51, the virtual information sending module 52 shown in FIG. 5). The processor 710 runs the software programs, instructions, and modules stored in the memory 720 to execute various functional applications and data processing of the device, so as to implement the map based navigation method as discussed in the above method embodiment.

The memory 720 may include a program storage area and a data storage area. The program storage area may store an operating system and an application program for at least one function. The data storage area may store data created according to the use of the terminal device, and the like. In addition, the memory 720 may include a high speed random access memory, and may further include a non-volatile memory, for example, at least one magnetic disk storage device, a flash memory device, or other non-volatile solid state storage devices. In some embodiments, the memory 720 may further include memories disposed remote to the processors 710. These remote memories may be connected to the terminal device through a network. Examples of the network include, but are not limited to, the Internet, an enterprise intranet, a local area network, a mobile communication network, and a combination thereof.

The input apparatus 730 may be used for receiving input digital or character information, and generating key signal inputs related to user settings of the terminal and the function control. The output apparatus 740 may include a display screen or other display devices.

The one or more modules are stored in the memory 720, and, when executed by the one or more processors 710, perform the following operations:

sending a current navigation route and an alternative navigation route to a navigation terminal held by a current user, causing the navigation terminal to determine and display, according to the current navigation route, a real location of the current user driving on the current navigation route; and sending virtual driving information of the current user to the navigation terminal, causing the navigation terminal to determine and display, according to the virtual driving information, a virtual location of the current user driving in simulation on the alternative navigation route.

Alternatively, the virtual driving information of the current user is an average speed of the alternative navigation route, and/or, real driving information of a reference user associated with the current user on the alternative navigation route.

Alternatively, the average speed is determined by following approach:

determining the average speed of the alternative navigation route according to current time and road condition information of the alternative navigation route.

Alternatively, the reference user is determined by following approach:

determining the reference user associated with the current user, according to the current time, a current virtual location and the alternative navigation route, upon detecting a reference user event, wherein an initial virtual location is a navigation start point of the current user.

Alternatively, if the current virtual location is a route decision point of the alternative navigation route, the reference user event is generated.

According to the descriptions of the above embodiments, those skilled in the art may clearly understand that the present disclosure may be implemented by means of software and necessary general-purpose hardware, and may be implemented, obviously, by means of hardware. However, the former is a preferred implementation in most circumstances. Based on such understanding, the technical solution of the present disclosure essentially, or the part contributing to the prior art may be embodied in the form of a software product. The computer software product may be stored in a computer readable storage medium, such as a floppy disk, a Read-Only Memory (ROM), a Random Access Memory (RAM), a flash memory, a hard disk or an optical disk of a computer, and includes several instructions for enabling a computer device (which may be a personal computer, a server, or a network device, and the like) to execute the method described in the embodiments of the present disclosure.

It should be noted that, in the above embodiments of the map based navigation apparatus, the units and modules included are merely divided according to a functional logic, but the present disclosure is not limited to the above division, as long as the corresponding functions can be achieved. In addition, the specific names of the functional units are merely used for distinguishing, and are not intended to limit the scope of the present disclosure.

The above descriptions are merely specific embodiments of the present disclosure, and the scope of the present disclosure is not limited thereto. Any changes or replacements that can be easily conceived of by those skilled in the art within the technical scope disclosed by the present disclosure should be covered by the protection scope of the present disclosure. Therefore, the protection scope of the present disclosure should be based on the protection scope of the claims.

What is claimed is:

1. A map based navigation method, the method comprising:

receiving a current navigation route, an alternative navigation route, and virtual driving information of a current user sent by a navigation server;

determining and displaying a real location of the current user driving on the current navigation route; and determining and displaying, according to the virtual driving information of the current user, a virtual location of the current user driving in simulation on the alternative navigation route, wherein the determining and displaying, according to the virtual driving information of the current user, the virtual location of the current user driving in simulation on the alternative navigation route, comprises:

determining a reference user associated with the current user according to current time, a current virtual location and the alternative navigation route, and determining, according to real driving information of the reference user associated with the current user included in the virtual driving information, the virtual location of the current user driving in simulation on the alternative navigation route, wherein the reference user associated with the current user is different in different road sections of the alternative navigation route, and if the current virtual location is a road intersection point or a road accident obstacle point, the reference user is reselected.

2. The method according to claim 1, wherein after determining and displaying, according to the virtual driving information of the current user, a virtual location of the current user driving in simulation on the alternative navigation route, the method further comprises:

comparing the current navigation route with the alternative navigation route, according to navigation behavior information of the real location and navigation behavior information of the virtual location, and displaying a comparison result.

3. The method according to claim 2, wherein the navigation behavior information includes at least one of navigation time, driving comfort information, or road attribute information.

4. A map based navigation method, the method comprising:
sending a current navigation route and an alternative navigation route to a navigation terminal held by a current user, causing the navigation terminal to determine and display, according to the current navigation route, a real location of the current user driving on the current navigation route; and
sending virtual driving information of the current user to the navigation terminal, causing the navigation terminal to determine and display, according to the virtual driving information, a virtual location of the current user driving in simulation on the alternative navigation route, wherein the virtual driving information of the current user comprises real driving information of a reference user associated with the current user on the alternative navigation route, wherein the reference user associated with the current user is determined according to current time, a current virtual location and the alternative navigation route, wherein the reference user associated with the current user is different in different road sections of the alternative navigation route, and if the current virtual location is a road intersection point or a road accident obstacle point, the reference user is reselected.

5. An map based navigation apparatus, the apparatus comprising:
at least one processor; and
a memory storing instructions, the instructions when executed by the at least one processor, cause the at least one processor to perform operations, the operations comprising:
receiving a current navigation route, an alternative navigation route and virtual driving information of a current user sent by a navigation server;
determining and display a real location of the current user driving on the current navigation route; and
determining and display, according to the virtual driving information of the current user, a virtual location of the current user driving in simulation on the alternative navigation route, wherein the determining and displaying, according to the virtual driving information of the current user, the virtual location of the current user driving in simulation on the alternative navigation route, comprises:
determining a reference user associated with the current user according to current time, a current virtual location and the alternative navigation route, and
determining, according to real driving information of the reference user associated with the current user included in the virtual driving information, the virtual location of the current user driving in simulation of the alternative navigation route, wherein the reference user associated with the current user is different in different road sections of the alternative navigation route, and if the current virtual location is a road intersection point or a road accident obstacle point, the reference user is reselected.

6. The apparatus according to claim 5, wherein after determining and displaying, according to the virtual driving information of the current user, a virtual location of the current user driving in simulation on the alternative navigation route, the operations further comprise:
comparing the current navigation route with the alternative navigation route, according to navigation behavior information of the real location and navigation behavior information of the virtual location, and displaying a comparison result.

7. The apparatus according to claim 6, wherein the navigation behavior information includes at least one of navigation time, driving comfort information, or road attribute information.

8. An map based navigation apparatus, the apparatus comprising:
at least one processor; and
a memory storing instruction wherein the method according to the claim 4 is implemented by the at least one processor executing the instructions.

9. A non-transitory computer storage medium storing a computer program, wherein the method according to the claim 1 is implemented by one or more processors executing the computer program.

10. A non-transitory computer storage medium storing a computer program, wherein the method according to the claim 4 is implemented by one or more processors executing the computer program.

* * * * *